United States Patent
Itou et al.

(10) Patent No.: US 10,239,110 B2
(45) Date of Patent: Mar. 26, 2019

(54) METHOD OF MANUFACTURING A LARGE- OR MEDIUM-SIZED WHEEL DISK AND A PRODUCT MANUFACTURED THEREBY

(71) Applicant: TOPY KOGYO KABUSHIKI KAISHA, Tokyo (JP)

(72) Inventors: Kikuya Itou, Ebina (JP); Koji Takeuchi, Ayase (JP); Yoshio Suzui, Ayase (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 260 days.

(21) Appl. No.: 14/650,945

(22) PCT Filed: Dec. 10, 2013

(86) PCT No.: PCT/JP2013/083025
§ 371 (c)(1),
(2) Date: Jun. 10, 2015

(87) PCT Pub. No.: WO2014/092062
PCT Pub. Date: Jun. 19, 2014

(65) Prior Publication Data
US 2015/0321242 A1 Nov. 12, 2015

(30) Foreign Application Priority Data
Dec. 11, 2012 (JP) .................. 2012-270125

(51) Int. Cl.
*B21K 1/00* (2006.01)
*B21D 53/26* (2006.01)
(Continued)

(52) U.S. Cl.
CPC ........... *B21D 53/265* (2013.01); *B21D 22/02* (2013.01); *B21D 35/006* (2013.01); *B60B 3/04* (2013.01);
(Continued)

(58) Field of Classification Search
CPC .... B21D 53/265; B21D 35/006; B21D 22/02; B60B 3/04; B60B 2310/206;
(Continued)

(56) References Cited

U.S. PATENT DOCUMENTS 7,171,838 B2 * 2/2007 Shiokawa .............. B21D 22/02
72/347

FOREIGN PATENT DOCUMENTS

| JP | 2006-35261 A | 2/2006 |
| JP | 2010-058126 A | 3/2010 |
| JP | 2011-240360 A | 12/2011 |

OTHER PUBLICATIONS

Xiang Liu et al., "Practical Metal Plate Working Handbook," China Machine Press, Beijing, Aug. 2012, ISBN978-7-111-39676-5, pp. 2-3. (Cited in CN OA Sep. 29, 2016, English partial translation).
(Continued)

*Primary Examiner* — Richard Chang
(74) *Attorney, Agent, or Firm* — Hunton Andrews Kurth LLP

(57) ABSTRACT

A method of manufacturing a large- or medium-sized wheel disk including using a punch or die in a first step of ironing a blank of a flat plate to a first-stage product. The first-stage product having a cylindrical rising portion with an axially non-constant thickness. The rising portion includes a thick portion located at a tip portion of the rising portion and a thickness-reduced portion which is a remaining portion of the rising portion excluding the thick portion. During the first step, only a portion of the blank corresponding to the thickness-reduced portion is ironed.

4 Claims, 6 Drawing Sheets

(51) Int. Cl.
  *B60B 3/04*  (2006.01)
  *B21D 22/02* (2006.01)
  *B21D 35/00* (2006.01)
  *B21K 1/28*  (2006.01)

(52) U.S. Cl.
  CPC ........... *B21K 1/28* (2013.01); *B60B 2310/206* (2013.01); *B60B 2310/213* (2013.01); *B60B 2360/102* (2013.01); *B60B 2360/141* (2013.01); *B60B 2900/212* (2013.01); *B60B 2900/325* (2013.01); *Y10T 29/49506* (2015.01)

(58) Field of Classification Search
  CPC ........ B60B 2360/102; B60B 2310/213; B60B 2900/325; B60B 2900/212; B60B 2360/141; Y10T 29/49506; B21K 1/28
  See application file for complete search history.

(56) References Cited

OTHER PUBLICATIONS

International Preliminary Report on Patentability, issued in International Application No. PCT/JP2013/083025 dated Jun. 16, 2015. (Includes Written Opinion of the International Search Authority, dated Mar. 18, 2014).

\* cited by examiner

METHOD OF MANUFACTURING A LARGE- OR MEDIUM-SIZED WHEEL DISK AND A PRODUCT MANUFACTURED THEREBY

CROSS-REFERENCE TO RELATED APPLICATIONS

This is a national phase application based on the International Patent Application No. PCT/JP2013/083025 filed Dec. 10, 2013, claiming priority to Japanese patent application No. 2012-270125 filed Dec. 11, 2012, the entire contents of both of which are incorporated herein by reference.

TECHNICAL FIELD

The present invention relates to a method of manufacturing a large- or medium-sized wheel disk manufactured from a blank of a flat plate and a product manufactured thereby.

BACKGROUND

Patent Document 1 discloses a conventional method of manufacturing a large- or medium-sized wheel disk including steps of: (a) ironing a blank of a flat plate to a first-stage product of a cup-like configuration having a cylindrical rising portion; and (b) diametrically enlarging the cylindrical rising portion of the first-stage product to a conical rising portion thereby forming the first-stage product to a second-stage product.

However, there are the following problems with the conventional method of manufacturing a large- or medium-sized wheel disk:
More particularly, in Patent Document 1, at the ironing step, an entirety of a portion of the blank corresponding to the rising portion of the first-stage product is ironed. However, in Patent Document 1, there is no teaching or suggestion about taking the next, second step of diametrically enlarging the rising portion into consideration when conducting the first step of ironing. Therefore, there is the possibility that cracks may be caused in the product material when diametrically enlarging the first-stage product to the second-stage product, because after having ironed the product material, the length of the ironed portion of the product material is significantly decreased.

RELATED ART DOCUMENT

Patent Document

Document 1: Patent Publication No. JP 2010-58126

BRIEF SUMMARY

Problems to be Solved

An object of the invention is to provide a method of manufacturing a large- or medium-sized wheel disk and a product manufactured thereby, capable of preventing cracks from being generated in comparison to conventional cases.

Means for Solving the Problems

The present invention achieves the above object is as follows:
(1) A method of manufacturing a large- or medium-sized wheel disk comprising:
 a first step of ironing a blank of a flat plate as a material to a first-stage product having a cylindrical rising portion of an axially non-constant thickness using a punch and a die, the first-stage product including a thick portion located at a tip portion of the rising portion and a thickness-reduced portion which is a remaining portion of the rising portion excluding the thick portion,
 wherein during the first step, only a portion of the blank corresponding to the thickness-reduced portion of the rising portion is ironed.
(2) A method of manufacturing a large- or medium-sized wheel disk according to item (1) above, further comprising:
 a second step conducted after the first step, of diametrically enlarging the rising portion of the first-stage product to form a conical rising portion thereby forming the first-stage product to a second-stage product; and
 a third step conducted after the second step, of forming the tip portion of the second-stage product to a final disk flange configuration thereby forming the second-stage product to a third-stage product.
(3) A method of manufacturing a large- or medium-sized wheel disk according to item (1) above, wherein at the first step, the blank of a flat plate is firstly press-formed to a configuration of a dish or a cup, and then is ironed using the punch and the die.
(4) The first-stage product for a large- or medium-sized wheel disk manufactured using the method according to item (1) above.

Technical Advantages

According to the method of manufacturing a large- or medium-sized wheel disk of item (1) above, the following technical advantage can be obtained:
The first-stage product manufactured at the first step includes the thick portion. Therefore, when the rising portion of the first-stage product is diametrically enlarged after the first step, less cracks are generated than in conventional cases.
According to the method of manufacturing a large- or medium-sized wheel disk of item (2) above, the following technical advantage can be obtained:
Since the second step and the third step are conducted after the first step, a second-stage product and a third-stage product having no cracks can be produced.
According to the method of manufacturing a large- or medium-sized wheel disk of item (3) above, the following technical advantages can be obtained:
At the first step, the blank of a flat plate is firstly press-formed to the configuration of a dish or a cup, and then is ironed by using the punch and the die. As a result, it is possible to more stably form the first-stage product than in a case where the blank of a flat plate is directly formed to the first-stage product. Further, a load loaded onto an ironing apparatus can be decreased.
According to the first-stage product for a large- or medium-sized wheel disk of item (4) above, the following technical advantages can be obtained:
The first-stage product includes the thick portion. Therefore, after the first step, when the rising portion of the first-stage product is diametrically enlarged, and less cracks are generated than in conventional cases a crack can be less generated than in the conventional case.

DETAILED DESCRIPTION OF THE PREFERRED EMBODIMENTS

A method of manufacturing a large- or medium (middle)-sized wheel disk according to an embodiment of the present invention will be explained below with reference to FIGS. 1-9.

First, a large- or medium-sized wheel disk (which may be called merely a wheel disk, hereinafter) 10 manufactured using the method of manufacturing a large- or medium-sized wheel disk according to an embodiment of the present invention will be explained. The wheel disk 10 is a large- or medium-sized wheel disk for use in a truck or a bus, etc. The wheel disk 10 may be a wheel disk for use in a car for private use or a vehicle for business or industry. The wheel disk 10 is manufactured from a disk material of a flat plate shown in FIG. 1. The wheel disk 10 is not a cast wheel. The wheel disk 10 is, for example, made from steel. Alternatively, the disk 10 may be made from aluminum alloy, titanium alloy or magnesium alloy, etc. The wheel disk 10 is manufactured independently of an annular rim (not shown, a portion of a wheel holding a tire) and is coupled with the rim by welding, a rivet, or an adhesive to construct a wheel.

Figure 7:
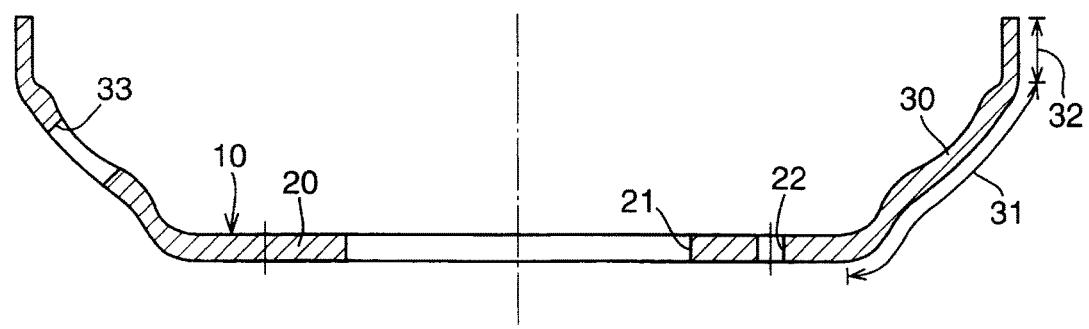
FIG. 7 is a cross-sectional view of a large- or medium-sized wheel disk manufactured by using the method of manufacturing a large- or medium-sized wheel disk according to an embodiment of the present invention.

As illustrated in FIG. 7, the wheel disk 10 includes a hub coupling portion (which may be called a flat plate portion) 20 fixed to a hub (not shown) and a rising portion (which may be called a side wall) 30 rising from a radially outer portion of the hub coupling portion 20 in an axial direction of the disk (i.e., in an axial direction of the wheel).

Usually, the hub coupling portion 20 is like a flat (including substantially flat) plate. When the hub coupling portion 20 is like a flat plate, the hub coupling portion 20 is perpendicular (including substantially perpendicular) to an axial direction of the disk. Since the hub coupling portion 20 is not thinned by ironing, the hub coupling portion 20 is the same (including substantially the same) thickness as a thickness of a blank 4 of a flat plate. A hub hole 21 and a hub bolt hole 22 are formed at the hub coupling portion 20.

The hub hole 21 is located at a central portion of the wheel disk 10 in a radial direction of the wheel disk (i.e., in a radial direction of the wheel).

Plural hub bolt holes 22 are equi-spaced in a circumferential direction of the disk (i.e., in a circumferential direction of the wheel) on a single circle.

The wheel disk 10 (or the wheel) is fixed to a hub (not shown) of the vehicle by causing a hub bolt (not shown) extending from the hub of the vehicle to pass through the hub bolt hole 22 and threading a hub nut (not shown) to the hub bolt.

The rising portion 30 includes a conical portion 31 and a disk flange 32.

The conical portion 31 is connected to the radially outer portion of the hub coupling portion 20. The conical portion 31 extends from the radially outer portion of the hub coupling portion 20 inclined in a direction outward in the radial direction of the disk and away from the radially outer portion of the hub coupling portion 20 in the axial direction of the disk so that a rising amount of the rising portion 30 is increased in the axial direction of the disk.

At least a portion of the conical portion 31 is thinned by ironing and is made smaller in thickness than the blank 4 of a flat plate. A vent window 33 is formed at the conical portion 31.

The disk flange 32 is located at an end portion of the rising portion 30 in a direction in which the rising portion 30 rises (i.e., in the axial direction of the disk). The disk flange 32 is located at a radially outer portion of the rising portion 30. The disk flange 32 is cylindrical so as to fit to a radially inner surface of the rim (not shown).

The disk flange 32 may be thinned by ironing, etc. so as to be smaller in thickness than the blank 4 of a flat plate. The disk flange 32 may not be thinned by ironing.

The wheel disk 10 is welded to the rim (not shown) at the disk flange 32.

Next, a method of manufacturing the wheel disk 10 will be explained.

Figure 1:
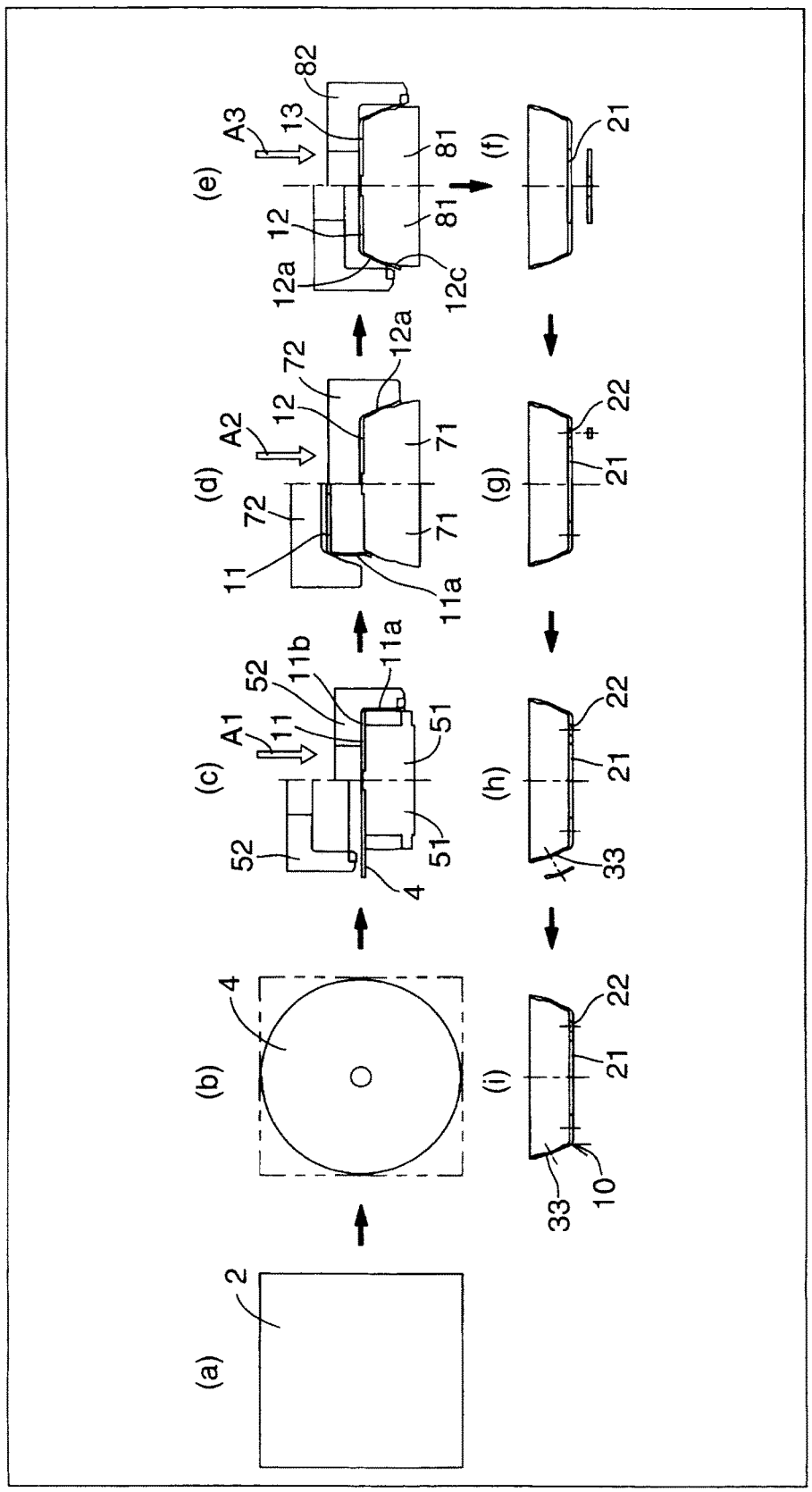
FIG. 1 is a process diagram of a method of manufacturing a large- or medium-sized wheel disk according to an embodiment of the present invention, where
(a) illustrates a disk material of a square, flat plate,
(b) illustrates a blank of a flat plate,
(c) illustrates a first step,
(d) illustrates a second step,
(e) illustrates a third step,
(f) illustrates a step for forming a hub hole by punching,
(g) illustrates a step for forming a hub bolt hole by punching,
(h) illustrates a step for forming a vent window by punching, and
(i) illustrates a wheel disk.

As illustrated in FIG. 1, the method of manufacturing the wheel disk 10 is a method manufacturing the wheel disk 10 from the blank 4 of a flat plate.

As illustrated in FIGS. 1 (a) and 1 (b), the blank 4 is manufactured by punching a square (including substantially square) disk material 2 of a flat plate to a circular (including substantially circular) flat plate or a substantially square flat plate four corners of which are cut in a shape of an arc.

The method of manufacturing the wheel disk 10 includes: (i) a first step (an ironing step) illustrated in FIG. 1 (c), of ironing the blank 4 using a punch 51 and a die 52 to a first-stage product 11 which includes a cylindrical rising portion 11a having a non-constant thickness and a flat portion 11b; (ii) a second step (a diametrically enlarging step) illustrated in FIG. 1 (d), of diametrically enlarging the rising portion 11a of the first-stage product 11 to form a conical rising portion 12a thereby forming the first-stage product 11 to a second-stage product 12; and (iii) a third step (a second ironing step) illustrated in FIG. 1 (e), of forming the tip portion 12c of the rising portion 12a of the second-stage product 12 to a final disk flange configuration (shown in FIG. 7) thereby forming the second-stage product 12 to a third-stage product 13.

The first step (the ironing step) of item (i) above will be explained below.

Figure 2:
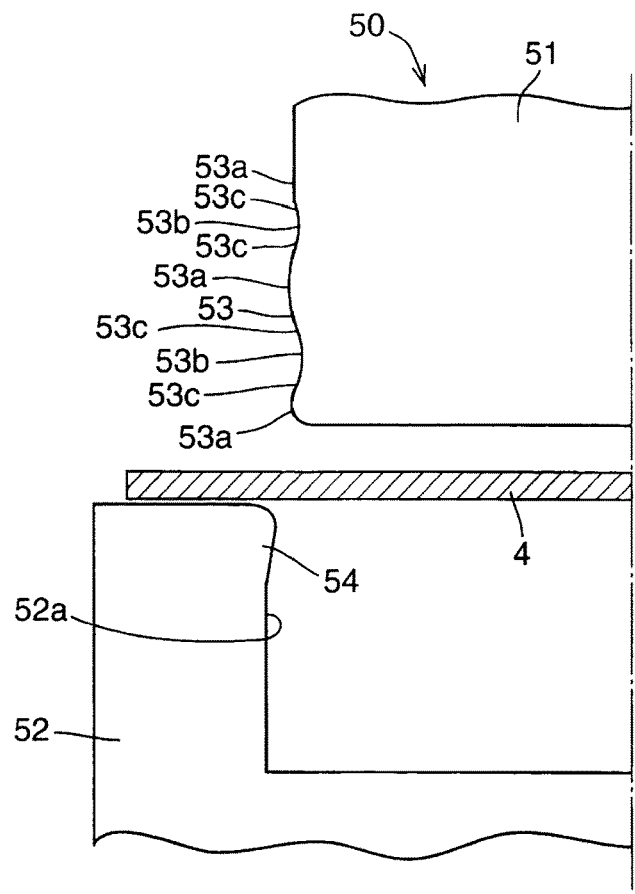
FIG. 2 is a cross-sectional view of an ironing apparatus at a state before the first step, used in the method of manufacturing a large- or medium-sized wheel disk according to an embodiment of the present invention, where hatchings of the ironing apparatus are omitted in order to clarify the drawing.
Figure 3:
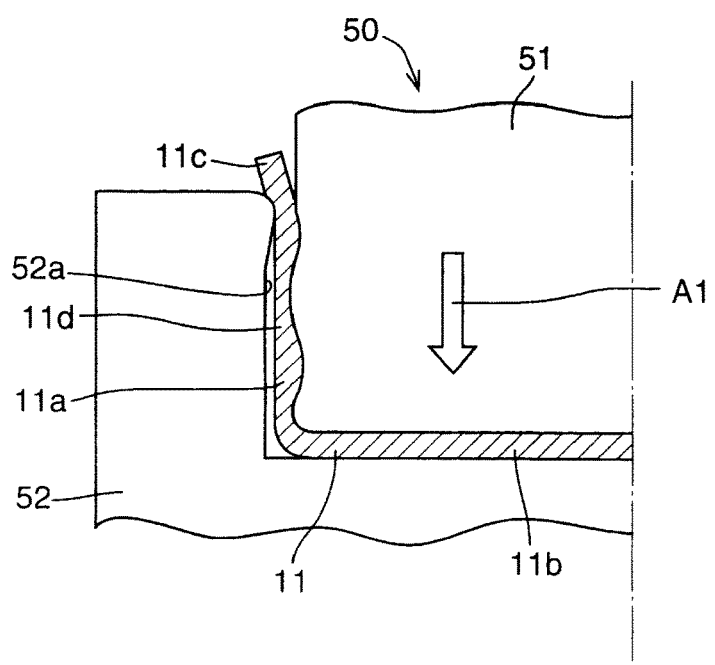
FIG. 3 is a cross-sectional view of the ironing apparatus at a state after the first step, used in the method of manufacturing a large- or medium-sized wheel disk according to an embodiment of the present invention, where hatchings of the ironing apparatus are omitted in order to clarify the drawing.

(i-1) As illustrated in FIGS. 2 and 3, the first step is a step for ironing the blank 4 of a flat plate to the first-stage product 11 using the punch 51 and the die 52.

(i-2) As illustrated in FIG. 3, the first-stage product 11 is a cup-like product including the flat portion 11b and the cylindrical rising portion 11a having a non-constant thickness. The first-stage product 11 includes a thick portion 11c (which may be called a thickness-remaining portion) located at a tip portion (an end portion opposite the flat portion 11b) of the rising portion 11a and a thickness-reduced portion 11d which is a remaining portion of the rising portion 11 excluding the thick portion 11. The thick portion 11c is provided at an entire circumference of the tip portion of the rising portion 11a.

(i-3) The first step is a step where not only ironing but also drawing are conducted. The drawing of the first step is a drawing for forming the blank 4 to a cup-like configuration.

(i-4) The first ironing step is conducted simultaneously over an entire circumference of the first-stage product by pressing. The ironing may be conducted one or more times including replacement of a die.

(i-5) As illustrated in FIG. 2, at the first step, the ironing is conducted using an ironing apparatus 50 which is a press machine having the punch 51 and the die 52.

Figure 6:
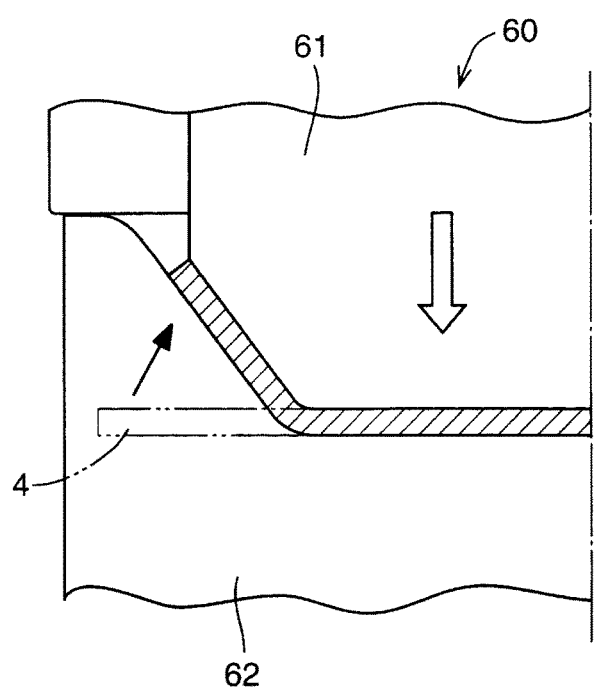
FIG. 6 is a cross-sectional view of a press-drawing apparatus, for press-drawing the blank of a flat plate to a configuration of a dish, used in the method of manufacturing a large- or medium-sized wheel disk according to an embodiment of the present invention, where hatchings of the drawing press are omitted in order to clarify the drawing.

The ironing may be conducted after the drawing shown in FIG. 6 has been conducted.

The die 52 has a protrusion 54 protruding inwardly in a radial direction of a cylindrical bore 52a at an inner surface of the die and irons the blank 4 by the protrusion 54.

Figure 8:
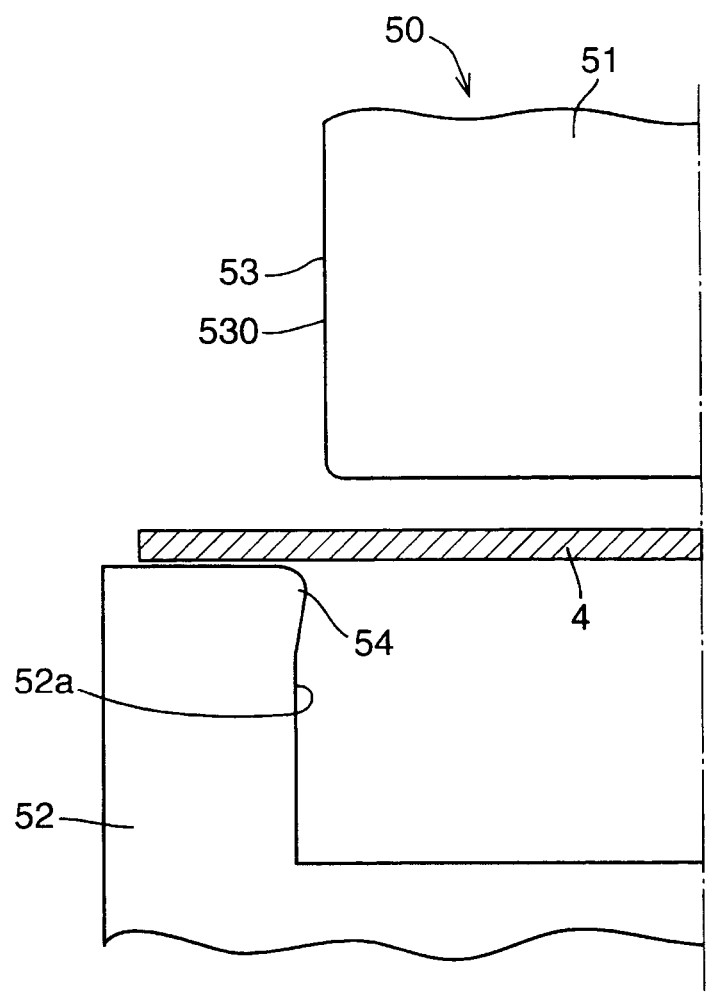
FIG. 8 is a cross-sectional view of an alteration of the ironing apparatus used at the first step, in the method of manufacturing a large- or medium-sized wheel disk according to an embodiment of the present invention.
Figure 9:
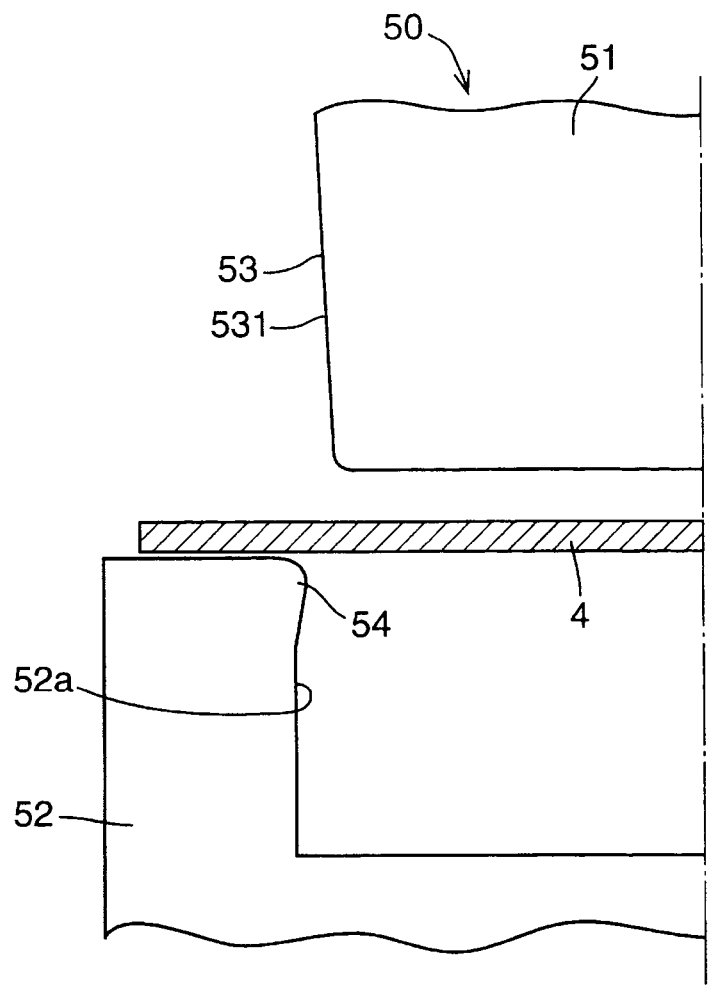
FIG. 9 is a cross-sectional view of another alteration of the ironing apparatus used at the first step, in the method of manufacturing a large- or medium-sized wheel disk according to an embodiment of the present invention.

The punch 51 is cylindrical. A convex-concave surface 53 is formed at a side surface of the punch 51 opposing the protrusion 54 of the die 52. The convex-concave surface 53 is a surface whose radial space from the protrusion 54 of the die 52 is not constant. Alternatively, as illustrated in FIG. 8, the convex-concave surface 53 may be a surface 530 whose radial space from the protrusion of the die is constant. As illustrated in FIG. 9, the convex-concave surface 53 may be a surface 531 whose radial space from the protrusion 54 of the die 52 gradually (smoothly) changes narrower (or wider). In order to make a space between the protrusion 54 of the die 52 and the side surface of the punch 53 opposing the protrusion 54 of the die 52 narrower than a thickness of the blank 4 having a constant thickness, the convex-concave surface 53 of the punch 51 may be provided with at least one convex portion 53a convex toward the protrusion 54 of the die 52 relative to a portion (i.e., a concave portion 53b) located adjacent the convex portion 53a of the side surface of the punch 51 in an axial direction and/or a circumferential direction of the punch 51.

A protruding amount of the convex portion 53a may be constant or non-constant between opposite ends of the convex portion 53a. In a case where plural convex portions 53a are provided, protruding amounts of the respective convex portions 53a may be equal or not equal to each other. The convex portion 53a may be provided at a portion or all portions of the side surface of the punch 51 opposing the protrusion 54 of the die 52.

In the axial direction of the side surface of the punch 51, one convex portion 53a and a concave portion 53b located adjacent the one convex portion 53a are connected by an inclined surface 53c which is not perpendicular to the axial direction of the punch 51. An angle between the inclined surface 53c and an axial direction of the side surface of the punch 51 is set at an angle desirably equal to or smaller than 60 degrees, and more preferably equal to or smaller than 45 degrees. An inclination angle of each inclined surface 53c may be constant or may change gradually.

(i-6) The die 52 is constructed of an outer die having the cylindrical bore 52a. The punch 51 is constructed of an inner punch which is moved into or out from the cylindrical bore 52a of the outer die 52 in the axial direction of the cylindrical bore 52a. The convex-concave surface 53 is formed at an outside surface of the inner punch. As illustrated in FIG. 3, a convex-concave configuration can be formed at only an inside surface of the rising portion 11a of the first-stage product 11 by the ironing conducted using the inner punch 51 and the outer die 52.

(i-7) At the first step, the blank 4 is ironed by moving the punch 51 relative to the die 52 in the axial direction of the blank 4 only (i.e., in the axial direction of the cylindrical bore 52a or the wheel disk 10). In FIG. 3, "A1" shows a moving direction of the punch 51. An upper-lower relationship between the punch 51 and the die 52 shown in FIG. 1 (c) may be opposite an upper-lower relationship between the punch 51 and the die 52 shown in FIGS. 2 and 3.

(i-8) As illustrated in FIG. 3, at the first step, a portion of the blank 4 corresponding to the thickness-reduced portion 11d may be ironed. A portion of the blank 4 corresponding to the thick portion 11c may be ironed to an extent that the thick portion 11c has a thickness equal to or larger than 90% of the thickness of the blank 4 after the first step, or may not be ironed. This is because a certain amount of "elongation of the material" of the thick portion 11 is kept at the first step, so that crack of the material is suppressed from happening during the diameter-enlarging at the second step. Most preferably, the thick portion 11c may not be ironed from the viewpoint of preventing a crack from being generated. In a case where the thick portion 11c is not ironed, the thickness of the thick portion 11c is the same (including substantially the same) as a thickness of the hub coupling portion 20 or is larger than the thickness of the hub coupling portion 20.

(i-9) At the first step, the blank 4 of a flat plate may firstly pressed to a configuration of a dish or a cup (i.e., the blank may be pre-formed to a configuration of a dish or a cup), and then is ironed using the punch 51 and the die 52 to thereby manufacture the first-stage product 11. As illustrated in FIG.

6, the pre-forming is a press-drawing forming conducted using a press-drawing apparatus 60 having a punch 61 and a die 62.

The second step (the diametrically enlarging step) of item (ii) above will be explained below.

(ii-1) The second step is conducted after the first step.

Figure 4:
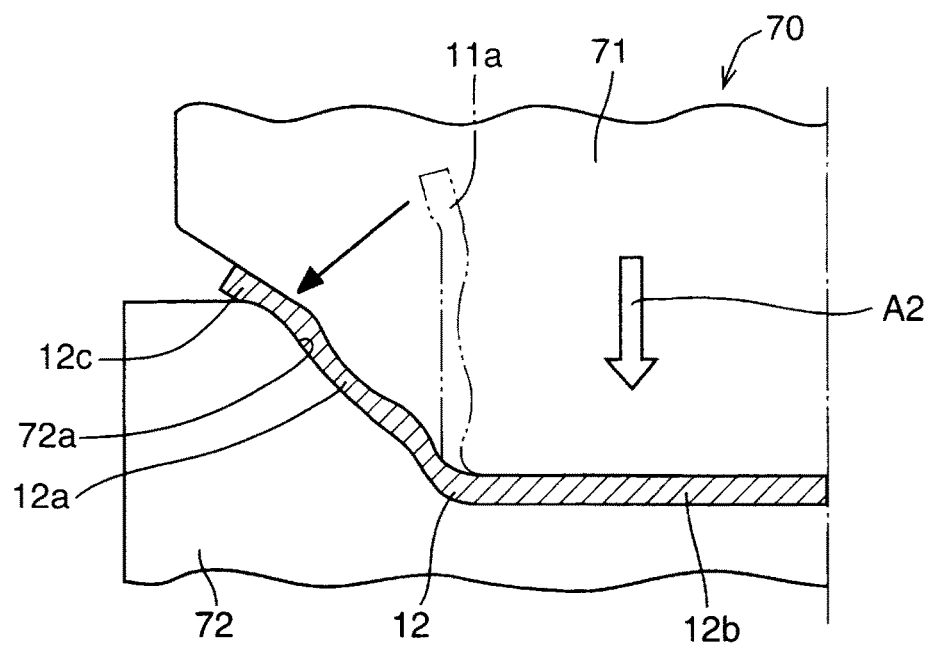
FIG. 4 is a cross-sectional view of a diameter-enlarging apparatus at a second step, used in the method of manufacturing a large- or medium-sized wheel disk according to an embodiment of the present invention, where hatchings of the diameter-enlarging apparatus are omitted in order to clarify the drawing.

(ii-2) As illustrated in FIG. 4, the second-stage product 12 includes a flat portion 12b and the conical rising portion 12a having a non-constant thickness, and has a configuration of a dish.

(ii-3) At the second step, the rising portion of the first-stage product is diametrically enlarged by forcibly inserting a punch 71 having a conical portion into the rising portion of the first-stage product 11. At the second step, not only diametrically enlarging but also forging may be conducted at a stroke end of the punch 71.

(ii-4) At the second step, the diametrically enlarging is conducted using a diameter-enlarging apparatus 70 which is a press machine installed with a punch 71 and a die 72.

(ii-5) The die 72 is constructed of an outer die having a conical bore 72a. The punch 71 is constructed of an inner punch which is moved into or out from the conical bore 72a of the outer die 72 in an axial direction of the conical bore 72a (i.e., in the axial direction of the wheel disk 10).

(ii-6) At the second step, the rising portion of the first-stage product to which a convex-concave configuration has been given is formed radially outwardly, whereby objective configuration and thickness distribution are obtained.

(ii-7) The second step is conducted simultaneously over an entire circumference of the product by pressing.

(ii-8) At the second step, the rising portion 11a of the first-stage product 11 is diametrically enlarged by forcibly moving the punch 71 relative to the die 72 only in an axial direction of the rising portion 11a of the first-stage product 11 (i.e., in the axial direction of the wheel disk 10). In FIG. 4, "A2" shows a moving direction of the punch 71. An upper-lower relationship between the punch 71 and the die 72 shown in FIG. 1 (d) may be opposite an upper-lower relationship between the punch 71 and the die 72 shown in FIG. 4.

(ii-9) Diametrical enlarging at the second step is not limited to the enlarging using the press machine described above and may be conducted using an expander (not shown), etc.

The third step of item (iii) above will be explained below.

(iii-1) The third step is conducted after the second step.

Figure 5:
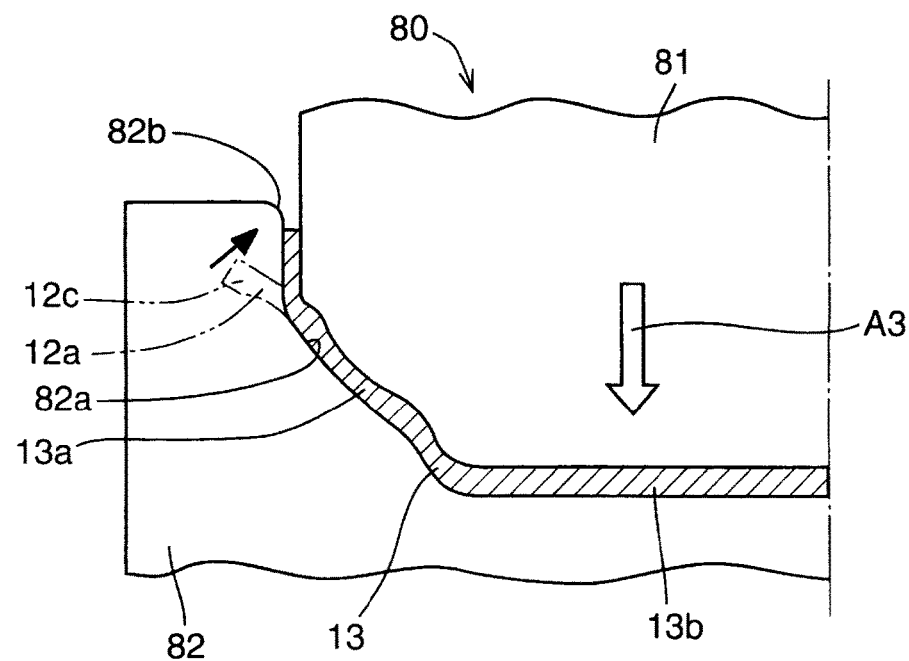
FIG. 5 is a cross-sectional view of a forming apparatus at a third step, used in the method of manufacturing a large- or medium-sized wheel disk according to an embodiment of the present invention, where hatchings of the forming apparatus are omitted in order to clarify the drawing.

(iii-2) As illustrated in FIG. 5, the third-stage product 13 includes a flat portion 13b and a rising portion 13a having a non-constant thickness, and has a configuration of a dish (including substantially a dish).

(iii-3) At the third step, drawing is conducted. At the third step, not only the drawing but also ironing may be conducted. Further, at the third step, only the ironing may be conducted.

(iii-4) At the third step, the tip portion 12c of the rising portion 12a of the second-stage product 12 is ironed, whereby the tip portion 12c is formed to a configuration of disk flange 32. At the third step, the tip portion 12c of the rising portion 12a of the second-stage product 12 is ironed and raised, whereby objective outside diameter and thickness of the disk flange can be obtained.

(iii-5) At the third step, ironing is conducted using a second apparatus 80 which is a press machine installed with a punch 81 and a die 82.

(iii-6) The die 82 is constructed of an outer die having a bore 82a, a vicinity of an open end of which is cylindrical. The punch 81 is constructed of an inner punch which is moved into or out from the bore 82a of the outer die 82 in an axial direction of the bore 82a (i.e., in the axial direction of the wheel disk 10).

(iii-7) The die 82 has an open end portion 82b located at the open end of the bore 82a and irons the end portion 12c of the rising portion 12a of the second-stage product 12 by the open end portion 82b.

(iii-8) At the third step, an entire circumference of the second-stage product is simultaneously formed using the press machine.

(iii-9) At the third step, the tip portion of the rising portion 12a of the second-stage product 12 is ironed by forcibly moving the punch 81 relative to the die 82 in an axial direction only of the rising portion 12a of the second-stage product 12 (i.e., in the axial direction of the wheel disk 10). In FIG. 5, "A3" shows a moving direction of the punch 81. An upper-lower relationship between the punch 81 and the die 82 shown in FIG. 1 (e) may be opposite an upper-lower relationship between the punch 81 and the die 82 shown in FIG. 5.

(iii-10) At the third step, the drawing conducted using the press machine shown in FIG. 5 may be replaced by flow-forming, etc.

(iii-11) At the third step, sizing by machining may be conducted after the drawing conducted using the press machine (or flow-forming, etc.)

(iii-12) The third step (for forming the tip portion 12c to the disk flange 32 configuration) may be conducted during the second step.

As illustrated in FIGS. 1(f), 1(g), 1(h) and 1(i), after the third step, the wheel disk 10 may be manufactured by punching the third-stage product to thereby form the hub hole 21, the hub bolt hole 22 and the vent window 23.

Next, technical advantages of the present invention will be explained. In the present invention, at the first step, the portion of the blank 4 corresponding to the thickness-reduced portion 11d is ironed. The portion of the blank 4 corresponding to the thick portion 11c may not be ironed or may be ironed such that the thick portion 11c has a thickness equal to or more than 90 percent of the thickness of the blank 4. As a result, when the rising portion 11a of the first-stage product 11 is diametrically enlarged after the first step, and cracks can be prevented from being generated in comparison to conventional cases.

At the first step, the blank 4 of a flat plate is firstly pressed to the configuration of a dish or a cup, and then is ironed using the punch 51 and the die 52. As a result, it is able to form the first-stage product 11 more stably than in a case where the blank 4 of a flat plate is directly formed to the first-stage product 11. Further, a load loaded onto the ironing apparatus 50 can be decreased.

Since the second step and the third step are conducted after the first step, the second-stage product 12, the third-stage product 13 and the large- or medium-sized wheel disk 10 where no cracks are generated can be obtained.

Further, since the first-stage product 11 is formed by ironing at the first step, any pushing flaw of parts of a flow-forming machine can be more suppressed from remaining at the surfaces of the first-stage product 11, the second-stage product 12, the third-stage product 13 and the large- or medium-sized wheel disk 10 than in a case where the first-stage product 11 is formed by flow-forming.

The portion of the blank 4 corresponding to the thickness-reduced portion 11d of the first-stage product is ironed at the first step. The portion of the blank 4 corresponding to the thick portion 11c is not ironed or is ironed such that the thick portion 11c has a thickness of more than 90 percent of the blank 4. As a result, when the rising portion 11a of the first-stage product 11 is diametrically enlarged after the first step, cracks can be suppressed in comparison with conventional cases.

If the blank is formed to the first-stage product by forging only, a large load is necessary resulting in increased initial costs. In contrast, in the present invention, since the blank is formed to the first-stage product by ironing, the forming load is significantly decreased, thus, resulting in lower initial costs.

In the above explanation of the embodiment of the present invention, the first step, the second step and the third step are conducted in that order. However, the order of the steps is not limited to that order. More particularly, the third step may be conducted during the second step.

EXPLANATION OF REFERENCE NUMERALS 2 flat plate disk material
4 blank
10 wheel disk
11 first-stage product
11a rising portion of the first-stage product
11b flat portion of the first-stage product
11c thick portion of the first-stage product
11d thickness-reduced portion of the first-stage product
12 second-stage product
12a rising portion of the second-stage product
12b flat portion of the second-stage product
12c tip portion of the rising portion of the second-stage product
13 third-stage product
13a rising portion of the third-stage product
13b flat portion of the third-stage product
20 hub coupling portion
21 hub hole
22 hub bolt hole
30 rising portion
31 conical portion
32 disk flange
33 vent window
50 ironing apparatus
51 punch
52 die
53, 530, 531 convex-concave surface
54 protrusion
60 drawing press
61 punch of the drawing press
62 die of the drawing press
70 diameter-enlarging apparatus
71 punch of the diameter-enlarging apparatus
72 die of the diameter-enlarging apparatus
80 disk flange forming press
81 punch of the disk flange forming press
82 die of the disk flange forming press

The invention claimed is:

1. A method of manufacturing a large- or medium-sized wheel disk comprising:
a first step of forming a blank of a flat plate as a material by ironing to a first-stage product having a cylindrical rising portion of an axially non-constant thickness using a punch and a die, the punch having a convex-concave side surface formed in a form of a wave having at least one convex portion and at least one concave portion connected to each other via an inclined surface inclined relative to an axial direction of the punch, the first-stage product including a thick portion located at a tip portion of the rising portion and a thickness-reduced portion which is a remaining portion of the rising portion excluding the thick portion, and
a second step conducted after the first step, of diametrically enlarging an entirety of the rising portion of the first-stage product to form a conical rising portion thereby forming the first-stage product to a second-stage product,
wherein during the first step, the thickness-reduced portion of the rising portion is ironed.

2. The method of manufacturing a large- or medium-sized wheel disk according to claim 1, further comprising:
a third step conducted after the second step, of forming the tip portion of the second-stage product to a final disk flange configuration thereby forming the second-stage product to a third-stage product.

3. The method of manufacturing a large- or medium-sized wheel disk according to claim 1, wherein at the first step, the blank of a flat plate is firstly press-formed to a configuration of a dish or a cup, and then is ironed using the punch and the die.

4. A method of manufacturing a large- or medium-sized wheel disk comprising:
a first step of forming a blank of a flat plate as a material by ironing to a first-stage product having a cylindrical rising portion of an axially non-constant thickness using a punch and a die, the punch having a convex-concave side surface formed in a form of a wave having at least one convex portion and at least one concave portion connected to each other via an inclined surface inclined relative to an axial direction of the punch, the first-stage product including a thick portion located at a tip portion of the rising portion and a thickness-reduced portion which is a remaining portion of the rising portion excluding the thick portion, and
a second step conducted after the first step, of diametrically enlarging an entirety of the rising portion of the first-stage product to form a conical rising portion thereby forming the first-stage product to a second-stage product,
a third step, the third step being conducted after the second step, of forming a tip portion of the second-stage product to a final disk configuration thereby forming the second-stage product to the third-stage product, wherein
the wheel disk includes a conical portion and a disk flange, the conical portion being thinned by ironing and having the non-constant thickness, and the wheel disk includes a surface made by ironing at a portion of the conical portion of the wheel disk, and
during the first step, the thickness-reduced portion of the rising portion is ironed.

* * * * *